June 15, 1926.

A. H. LEIPERT 1,588,968

NONMETALLIC CONNECTION FOR RADIUS RODS

Filed Sept. 11, 1923    2 Sheets-Sheet 2

Patented June 15, 1926.

UNITED STATES PATENT OFFICE.

AUGUST H. LEIPERT, OF NEW YORK, N. Y., ASSIGNOR TO INTERNATIONAL MOTOR COMPANY, OF NEW YORK, N. Y., A CORPORATION OF DELAWARE.

NONMETALLIC CONNECTION FOR RADIUS RODS.

Application filed September 11, 1923. Serial No. 662,038.

This invention relates to cushioning devices operatively associated with the radius rods of motor vehicles and more particularly to such cushioning devices of a wholly non-metallic, resilient character. Radius rods are provided in motor driven vehicles to overcome or counteract tortional stresses and to transmit driving thrusts. Tortional stresses result from the tendency of the dead axle upon which the wheels are carried to revolve backwardly instead of the wheels rotating forwardly, when it is intended that the vehicle travel in a forward direction and to revolve forwardly when it is intended that the vehicle travel in a rearward direction. Driving thrusts are transmitted from the axle to the vehicle frame in the propulsion of the vehicle. One end of the radius rod is carried with the dead axle while the other end is secured to an element of the frame. Heretofore, radius rods have been of rigid construction and their connections with the vehicle frame have been of rigid metallic character so that the tortional stresses and driving thrusts originating at the axle have been transmitted by the radius rods and connections and impressed upon the frame with sudden undiminished intensity if not actually with increased intensity. Moreover, the metallic connections, being continually subjected to stresses and thrusts, have become worn quickly, worked loose and occasioned objectionable noises and squeaks.

The present invention has for its object to cushion such tortional stresses and driving thrusts and prevent their sudden impression on the vehicle frame. Accordingly, cushioning devices comprising a block or blocks of yielding non-metallic material, such as rubber, are operatively associated with the radius rod. In one modification of the invention the block or blocks of yielding non-metallic material are incorporated in the length of the radius rod. It may sometimes be found advantageous to utilize the cushioning device as a wholly non-metallic, resilient connection and support between the end of the radius rod and the vehicle frame whereby not only the stresses and thrusts are cushioned or absorbed but wear in the connection with its resulting play and accompanying noises are eliminated. According to another modification of the invention, therefore, a wholly non-metallic connection and support comprising a block or blocks of yielding, non-metallic material, such as rubber, is interposed between the end of the radius rod and the vehicle frame. In certain circumstances it may be found advantageous to supplement the effect of the non-metallic connection and support by a cushioning device arranged in the length of the radius rod and a further aspect of the invention contemplates the combination of both the modifications hereinbefore described.

The blocks of yielding non-metallic material, such as rubber, will generally be retained under internal static pressure which materially increases their resiliency, life and wearing qualities.

In order that the invention may be clearly understood and readily carried into effect the same will now be described more fully with reference to the accompanying drawings illustrating the preferred embodiments thereof, and in which—

The incorporation of a cushioning device in the radius rod structure will first be described.

Only so much of a radius rod and its disposition with respect to the motor vehicle has been illustrated as is deemed necessary to an understanding of the invention but it will be understood that the rear end of the radius rod is carried with the dead axle (not shown) while the forward end is connected to the frame in proximity to the jack shaft. The front end of the radius rod is sometimes carried directly on the jack shaft, but it has been preferred to illustrate the radius rod as connected to the vehicle frame $a$, in proximity to the jack shaft $b$, by means of a bracket $c$. The radius rod is indicated in general at D and comprises, in the main, a section $d$ carried with the rear axle, a section $d'$ secured thereto and a section $d^2$ connected with the vehicle frame, and adjustable with respect to section $d'$ whereby the overall length of the radius rod may be accommodated to the particular job.

Figure 1:
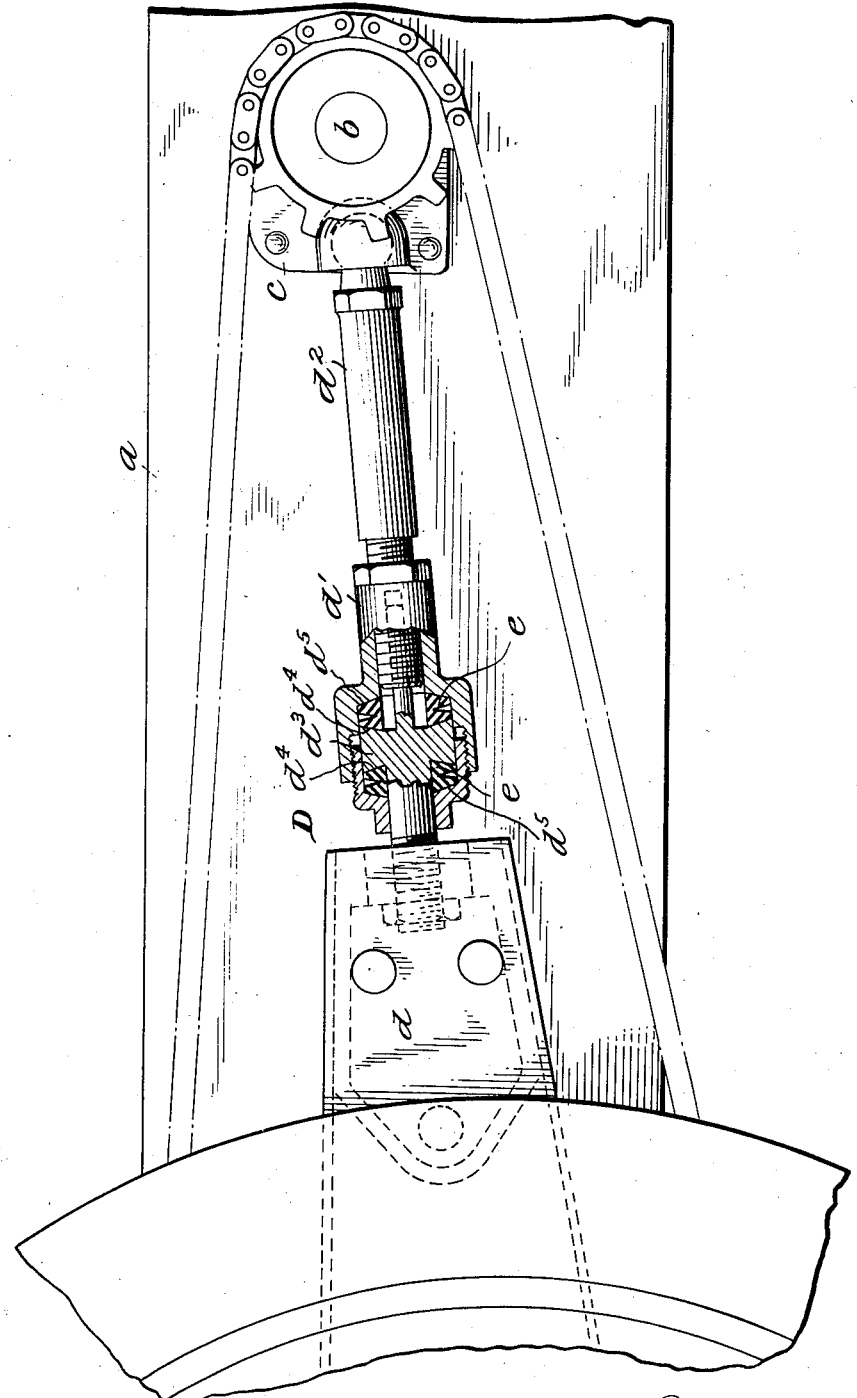
Figure 1 is a fragmentary view in side elevation of so much of the frame and associated driving elements of a motor vehicle as is necessary for an understanding of the improvements, parts being broken away to show a cushioning device incorporated in the length of the radius rod.
Figure 3:
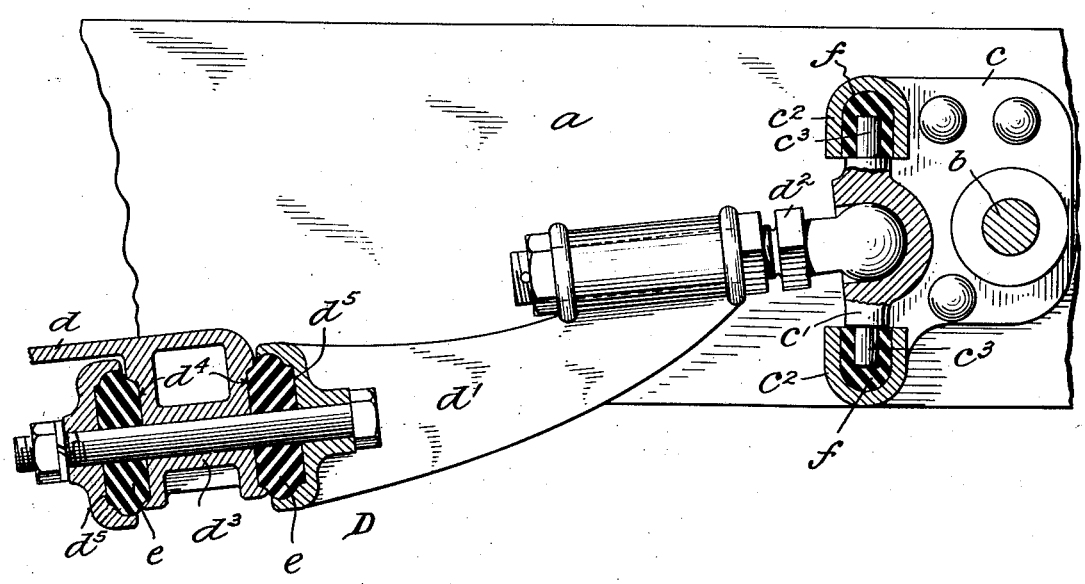
Figure 3 is a fragmentary view in side elevation, of a modified form of radius rod having a cushioning device incorporated in the length thereof and the end connected to the vehicle frame by means of the improved cushioning device.

In Figs. 1 and 3 section $d^2$ is illustrated as provided with a ball end for reception in a socket carried with the bracket $c$ for universal movement. Between the sections $d$ and $d'$ blocks $e$ of yielding non-metallic material are interposed to cushion tortional stresses and driving thrusts. These blocks are preferably of rubber and are retained under compression. By so retaining the blocks their strength, resiliency and wearing qualities are increased. The section $d$ is formed with or carries adjustably a part $d^3$ arranged for engagement with the blocks $e$ which are disposed on either side thereof and are retained between seats $d^4$ on the part $d^3$ and opposed seats $d^5$ on section $d'$. In Fig. 3 a cushioning device is illustrated as interposed between the end of the radius rod and the vehicle frame. The socket of the ball and socket connection between the radius rod and bracket is shown as formed in a socket member $c'$ separate from the bracket $c$ but connected therewith through blocks $f$ of yielding non-metallic material retained in seats or open ended housings $c^2$, carried with brackets $c$, and engaging stud portions carried with the socket member $c'$. These blocks $f$ are also preferably retained in the housings under compression for the purpose previously specified.

Figure 2:
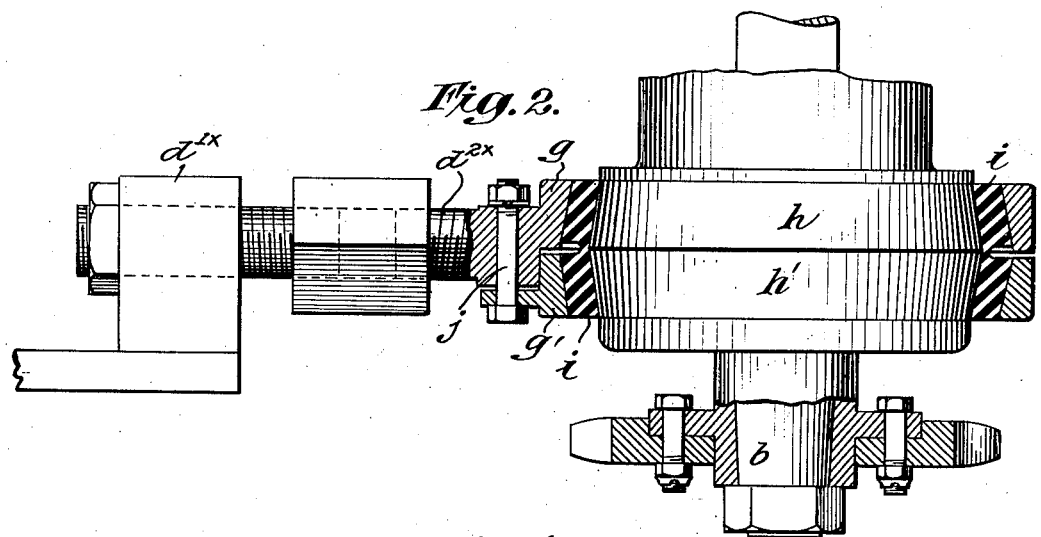
Figure 2 is a fragmentary view, partly in horizontal section and partly in plan, of the jack-shaft and radius rod of a chain drive motor vehicle, and showing the cushioning device as comprising a connection and support between the end of the radius rod and the vehicle frame.

A modification of the cushioning device when used as a yielding non-metallic connection and support between the end of the radius rod and vehicle frame is illustrated in Fig. 2. The radius rod, in this instance, is not provided with a ball and socket joint to permit universal movement between the rod and frame, but that portion of the rod corresponding to the section $d^2$ previously described, and indicated as $d^{2x}$ in Fig. 2, is adjustable with respect to the section $d^{1x}$ whereby the overall length of the rod may be adjusted to the particular job. Section $d^{2x}$ is formed with a two part annular portion $g$, $g'$ through which the jack shaft $b$ extends. Surrounding the jack shaft is a sleeve section also formed in two parts $h$, $h'$ respectively, the part $h$ being concentric with the annulus $g$, and the part $h'$ being concentric with the part $g'$. Between the parts $g$, $g'$ and the sleeve sections $h$, $h'$ there is disposed a ring of yielding non-metallic material such as rubber. Preferably the ring $i$ is of such size as to be retained between the annuli and sleeve under compression whereby its resilience, strength and wearing qualities are increased. The tapered surfaces of the annuli and the outer surface of the sleeves insure retention of the ring in the desired position. In assembling, the annulus $g$ may be first positioned with respect to the shaft, then the ring $i$ inserted in the annulus, whereafter the sleeve portions $h$, $h'$ are forced within the ring in the order named, the annulus $g'$ being then forced onto the outer half of the ring and secured in position by means of the bolt $j$.

While it will be understood that the invention in its broadest aspects resides in the operative association of the non-metallic yielding material with the radius rod for the purpose of cushioning driving thrusts, tortional stresses and the like, it will be appreciated that some practical limitations may be present in its successful applications since, for instance, it is necessary that the radius rod, if associated with the brake band, be in fixed relation to the axle.

What I claim is:

1. In a motor vehicle, in combination with the axle and frame, a positive mechanical connection therebetween including a sectional radius rod, a block of non-metallic yielding material interposed between said sections and means carried by the sections to support the block.

2. In a motor vehicle, in combination with the axle and frame, a positive mechanical connection therebetween including a radius rod comprising relatively adjustable sections, a block of non-metallic yielding material maintained between said sections under compression and means carried by the sections to support the block.

3. In a motor vehicle, in combination with the axle and frame, a positive mechanical non-metallic yielding connection therebetween including a radius rod comprising relatively adjustable sections, a plurality of blocks of non-metallic yielding material, a member carried on one section and having seats formed on its remote faces for said blocks and co-operating seats for said blocks carried by another section, respectively, and means to maintain the blocks under compression.

This specification signed this 6th day of Sept. A. D. 1923.

AUGUST H. LEIPERT.